（12）United States Patent
Siddhamalli et al.

(10) Patent No.: US 9,987,784 B2
(45) Date of Patent: Jun. 5, 2018

(54) THERMOPLASTIC ELASTOMER TUBING AND METHOD TO MAKE AND USE SAME

(71) Applicant: SAINT-GOBAIN PERFORMANCE PLASTICS CORPORATION, Solon, OH (US)

(72) Inventors: Sridhar Krishnamurthi Siddhamalli, Lutz, FL (US); Mark W. Simon, Pascoag, RI (US); Steven Schrader, Bowling Green, KY (US); Todd E. Kundinger, Midland, MI (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days. days.

(21) Appl. No.: 15/044,729

(22) Filed: Feb. 16, 2016

(65) Prior Publication Data

US 2016/0158988 A1    Jun. 9, 2016

Related U.S. Application Data

(63) Continuation of application No. 13/907,488, filed on May 31, 2013, now Pat. No. 9,334,984.
(Continued)

(51) Int. Cl.
*B29C 47/00* (2006.01)
*F16L 11/04* (2006.01)
(Continued)

(52) U.S. Cl.
CPC .......... *B29C 47/0023* (2013.01); *B29C 47/40* (2013.01); *B29C 47/802* (2013.01);
(Continued)

(58) Field of Classification Search
CPC .................................................. B29C 47/0023
See application file for complete search history.

(56) References Cited

U.S. PATENT DOCUMENTS 3,911,202 A   10/1975  Stine et al.
4,031,169 A    6/1977  Morris
(Continued)

FOREIGN PATENT DOCUMENTS

AR         091283 A1     1/2015
AU       2010343054      6/2014
(Continued)

OTHER PUBLICATIONS

"Electron Beam processing of Polymers", Sujit K. Datta, Tapan K. Chaki and Anil K. Bhowmick, Advanced Polymer Processing Operations, pp. 157-186 (1998).
(Continued)

*Primary Examiner* — Larry Thrower
(74) *Attorney, Agent, or Firm* — Abel Law Group, LLP; Chi Suk Kim

(57) ABSTRACT

A thermoplastic elastomer tube can include a thermoplastic elastomer component disposed within a matrix. In an embodiment, the thermoplastic elastomer component is disposed within the matrix in a thermoplastic elastomer phase having a number of domains. At least approximately 50% of the domains of the thermoplastic elastomer component have an aspect ratio of no greater than approximately 1.5. In a particular embodiment, the thermoplastic elastomer tube comprises at least approximately 20 wt % of the thermoplastic elastomer component and no greater than approximately 50 wt % of a polyolefin component. In some embodiments, the thermoplastic elastomer component includes styrene.

19 Claims, 6 Drawing Sheets

Related U.S. Application Data

(60) Provisional application No. 61/656,402, filed on Jun. 6, 2012.

(51) Int. Cl.

| | |
|---|---|
| *B32B 1/08* | (2006.01) |
| *F16L 11/06* | (2006.01) |
| *B29C 47/40* | (2006.01) |
| *B29C 47/80* | (2006.01) |
| *B29K 105/00* | (2006.01) |
| *B29L 23/00* | (2006.01) |
| *B29K 21/00* | (2006.01) |
| *B29K 23/00* | (2006.01) |
| *B29C 47/36* | (2006.01) |
| *B29C 47/68* | (2006.01) |
| *B29C 47/08* | (2006.01) |
| *B29K 105/24* | (2006.01) |
| *B29C 47/10* | (2006.01) |
| *B29C 47/88* | (2006.01) |
| *B29C 47/90* | (2006.01) |

(52) U.S. Cl.
CPC ............... *B32B 1/08* (2013.01); *F16L 11/04* (2013.01); *F16L 11/06* (2013.01); *B29C 47/0066* (2013.01); *B29C 47/0898* (2013.01); *B29C 47/1063* (2013.01); *B29C 47/366* (2013.01); *B29C 47/367* (2013.01); *B29C 47/368* (2013.01); *B29C 47/68* (2013.01); *B29C 47/8825* (2013.01); *B29C 47/8835* (2013.01); *B29C 47/8895* (2013.01); *B29C 47/908* (2013.01); *B29C 2793/0027* (2013.01); *B29K 2021/003* (2013.01); *B29K 2023/12* (2013.01); *B29K 2105/0038* (2013.01); *B29K 2105/24* (2013.01); *B29K 2105/246* (2013.01); *B29L 2023/007* (2013.01); *B29L 2023/22* (2013.01); *Y10T 137/85978* (2015.04); *Y10T 428/139* (2015.01)

(56) References Cited

U.S. PATENT DOCUMENTS

| | | | |
|---|---|---|---|
| 4,101,699 A | 7/1978 | Stine et al. | |
| 4,104,210 A | 8/1978 | Coran et al. | |
| 4,302,557 A | 11/1981 | Yoshimure et al. | |
| 4,678,834 A | 7/1987 | Boivin et al. | |
| 4,701,496 A | 10/1987 | Yoshimura et al. | |
| 4,705,657 A | 11/1987 | Poulin | |
| 4,842,024 A | 6/1989 | Palinchak | |
| 5,007,943 A | 4/1991 | Kelly et al. | |
| 5,080,942 A | 1/1992 | Yau | |
| 5,159,016 A | 10/1992 | Inoue et al. | |
| 5,264,488 A | 11/1993 | Takeuchi et al. | |
| 5,407,971 A | 4/1995 | Everaerts et al. | |
| 5,539,052 A | 7/1996 | Shieh et al. | |
| 5,550,190 A | 8/1996 | Hasegawa et al. | |
| 5,638,871 A | 6/1997 | Iorio et al. | |
| 5,743,304 A | 4/1998 | Mitchell et al. | |
| 5,843,577 A | 12/1998 | Ouhadi et al. | |
| 5,847,052 A * | 12/1998 | Hamanaka | B29C 47/38 264/211.23 |
| 5,869,555 A | 2/1999 | Simmons et al. | |
| 5,883,145 A | 3/1999 | Hurley et al. | |
| 5,952,396 A | 9/1999 | Chang | |
| 5,985,962 A | 11/1999 | Knors et al. | |
| 6,053,214 A | 4/2000 | Sjoberg et al. | |
| 6,063,867 A | 5/2000 | Wang et al. | |
| 6,339,123 B1 | 1/2002 | Raetzsch et al. | |
| 6,544,451 B1 * | 4/2003 | Heitner | B29C 47/92 264/102 |
| 6,569,915 B1 | 5/2003 | Jackson et al. | |
| 6,656,552 B1 | 12/2003 | Crouse | |
| 6,743,860 B2 | 6/2004 | Mizuno | |
| 6,846,535 B2 | 1/2005 | De Groot et al. | |
| 6,977,105 B1 | 12/2005 | Fujieda et al. | |
| 7,029,732 B2 | 4/2006 | Wang et al. | |
| 7,253,233 B2 | 8/2007 | Sugimoto et al. | |
| 7,262,248 B2 | 8/2007 | Wright et al. | |
| 7,393,900 B2 | 7/2008 | Snider | |
| 7,641,753 B2 | 1/2010 | Gao et al. | |
| 7,714,071 B2 | 5/2010 | Hoenig et al. | |
| 7,754,816 B2 | 7/2010 | Snider | |
| 7,923,121 B2 | 4/2011 | Jackson et al. | |
| 8,062,726 B2 | 11/2011 | Greiner et al. | |
| 8,956,706 B2 | 2/2015 | Siddhamalli et al. | |
| 9,133,332 B2 | 9/2015 | Kawamoto et al. | |
| 2002/0068137 A1 | 6/2002 | Paleari et al. | |
| 2003/0052431 A1 | 3/2003 | Shah et al. | |
| 2003/0199623 A1 | 10/2003 | Demay et al. | |
| 2004/0132907 A1 | 7/2004 | Nakamura et al. | |
| 2004/0162393 A1 | 8/2004 | Matsuda et al. | |
| 2004/0219317 A1 | 11/2004 | Belcher | |
| 2005/0031811 A1 | 2/2005 | Mehan et al. | |
| 2005/0217746 A1 | 10/2005 | Hayashi et al. | |
| 2005/0229991 A1 | 10/2005 | Hardy et al. | |
| 2005/0239940 A1 | 10/2005 | Shima et al. | |
| 2006/0063850 A1 | 3/2006 | Kanae et al. | |
| 2006/0211819 A1 | 9/2006 | Hoenig et al. | |
| 2006/0225803 A1 | 10/2006 | Chenoweth et al. | |
| 2007/0009696 A1 | 1/2007 | Nakamura et al. | |
| 2007/0066753 A1 | 3/2007 | Ehrlich et al. | |
| 2007/0087150 A1 | 4/2007 | Powell et al. | |
| 2007/0225429 A1 | 9/2007 | Wright et al. | |
| 2007/0282073 A1 | 12/2007 | Weng et al. | |
| 2007/0284787 A1 | 12/2007 | Weng et al. | |
| 2008/0045619 A1 | 2/2008 | Jackson et al. | |
| 2008/0242758 A1 | 10/2008 | Jackson et al. | |
| 2008/0257441 A1 | 10/2008 | Allen et al. | |
| 2009/0292075 A1 | 11/2009 | Tamai et al. | |
| 2009/0299260 A1 | 12/2009 | Kreischer et al. | |
| 2010/0175804 A1 | 7/2010 | Lesage et al. | |
| 2010/0214376 A1 | 8/2010 | Nakano et al. | |
| 2010/0233400 A1 | 9/2010 | Sano | |
| 2011/0319837 A1 | 1/2011 | Uehara et al. | |
| 2011/0061782 A1 | 3/2011 | Merino Lopez et al. | |
| 2011/0241262 A1 * | 10/2011 | Siddhamalli | B29C 47/862 264/471 |
| 2011/0251596 A1 | 10/2011 | Kim et al. | |
| 2012/0048380 A1 | 3/2012 | Thomas et al. | |
| 2012/0305123 A1 * | 12/2012 | Kourogi | C08L 23/14 138/177 |
| 2013/0030124 A1 * | 1/2013 | Tomoi | C08G 69/48 525/113 |
| 2013/0072633 A1 | 3/2013 | Kawamoto et al. | |
| 2013/0327428 A1 | 12/2013 | Siddhamalli et al. | |
| 2015/0337126 A1 | 11/2015 | Siddhamalli et al. | |

FOREIGN PATENT DOCUMENTS

| | | |
|---|---|---|
| AU | 2013202461 | 3/2015 |
| BR | 11 2012 014916 4 | 11/2012 |
| BR | 1120140289239 | 12/2014 |
| CA | 2127575 | 1/1995 |
| CN | 1486243 A | 3/2004 |
| CN | 1730518 A | 2/2006 |
| CN | 1929884 A | 3/2007 |
| CN | 10486818 A | 7/2009 |
| CN | 101486818 A | 7/2009 |
| CN | 102372893 A | 3/2012 |
| CN | 104349890 A | 2/2015 |
| CN | 102782036 B | 1/2016 |
| CN | 105694333 A | 6/2016 |
| EP | 1120240 A2 | 8/2001 |
| EP | 1688458 A1 | 8/2006 |
| EP | 2519580 | 3/2015 |
| EP | 2858813 A1 | 4/2015 |
| FR | 2730242 A1 | 8/1996 |
| FR | 2799199 A1 | 4/2001 |
| GB | 2007682 A | 5/1979 |
| IN | 1730/MUMNP/2012 A | 10/2013 |

(56) References Cited

FOREIGN PATENT DOCUMENTS

| | | | |
|---|---|---|---|
| JP | 58098347 A | 6/1983 |
| JP | 58145751 A | 8/1983 |
| JP | 58225103 A | 12/1983 |
| JP | 59131613 A | 7/1984 |
| JP | 60166339 A | 8/1985 |
| JP | 63172753 A | 7/1988 |
| JP | 4025520 A | 1/1992 |
| JP | 4139219 A | 5/1992 |
| JP | H04159344 A | 6/1992 |
| JP | H0593125 A | 4/1993 |
| JP | H05-338008 A | 12/1993 |
| JP | H05-339008 A | 12/1993 |
| JP | 8294967 A | 11/1996 |
| JP | 10067893 A | 3/1998 |
| JP | 10087902 A | 4/1998 |
| JP | 10273511 A | 10/1998 |
| JP | 11060835 A | 3/1999 |
| JP | 2001240719 A | 9/2001 |
| JP | 2002173574 A | 6/2002 |
| JP | 2003012865 A | 1/2003 |
| JP | 2003049977 A | 2/2003 |
| JP | 2005093125 A | 4/2005 |
| JP | 2005225977 A | 8/2005 |
| JP | 2005314550 A | 11/2005 |
| JP | 2007254514 A | 10/2007 |
| JP | 2008-137358 A | 6/2008 |
| JP | 2009045793 A | 3/2009 |
| JP | 2009126170 A | 6/2009 |
| KR | 10-0779446 B1 | 11/2007 |
| KR | 10-1421432 | 7/2014 |
| KR | 10-2015-0016347 A | 2/2015 |
| TW | 201136952 A | 11/2011 |
| TW | 201350720 A | 12/2013 |
| WO | 00/69930 A1 | 11/2000 |
| WO | 0112717 A1 | 2/2001 |
| WO | 02/32983 A1 | 4/2002 |
| WO | 2005054360 A2 | 6/2005 |
| WO | 2007111849 A2 | 10/2007 |
| WO | 2008014597 A1 | 2/2008 |
| WO | 2011/090759 | 7/2011 |
| WO | 2011090759 A2 | 7/2011 |
| WO | 2011096282 A1 | 8/2011 |
| WO | 2012/133927 A1 | 10/2012 |
| WO | 2013184517 A1 | 12/2013 |

OTHER PUBLICATIONS

"Mechanical Properties and heat shrinkability of e-beam crosslinked polyethylene-octene copolymer", Joy K. Mishra, Young-Wook Chang, Byung Chul Lee and Sung Hun Ryu, Radiation Physics and Chemistry, vol. 77 (2008), pp. 675-679.

"Measurement of crosslinking degree for E-beam irradiated block copolymers", Hisashige Kanbara, Samuel J. Huang and Julian F. Johnson, Polymer Engineering and Science, vol. 34 (1994), pp. 691-694.

"Characterization of e-beam crosslinked Poly (styrene-block-ethylene-co-butylene-block-styrene)" D.E. Zurawski and L. H. Sperling, Polymer Engineering and Science, vol. 23 (1983), pp. 510-515.

"Effects of gamma irradiation on ethylene-octene copolymers produced by constrained geometry catalyst", Roberto S. Benson, Erin A. Moore, Ma. Esther Martinez-Pardo and Daniel Luna Zaragoza, Nuclear Instruments and Methods in and Daniel Luna Zaragoza, Nuclear Instruments and Methods in Physics Research B, vol. 151 (1999), pp. 174-180.

Co-continuous morphologies in polymer blends with SEBS block copolymers, Harm Veenstra, Barbara J.J. van Lent, Jaap van Dam, and Abe Posthuma de Boer, Polymer vol. 40 (1999), pp. 6661-6672.

Compatibilisation of polystyrene-polyolefin blends, Tracey Appleby, Ferenc Cser, Graeme Moad, Ezio Rizzardo, and Con Starvropoulos, Polymer Bulletin, vol. 32 (1994), pp. 479-485.

Effects of molecular weight of SEBS triblock copolymer on the morphology, impact strength, and rheological property of syndiotactic polystyrene/ethylene-propylene rubber blends, B.K Hong and W.H Jo, Polymer, vol. 41 (2000), pp. 2069-2079.

Functionalization of Polyolefins and Elastomers with an Oxazoline Compound, U. Anttila, C. Vocke, and J. Seppala, Journal of Applied Polymer Science, vol. 72, (1999), pp. 877-885.

High Performance Styrenic Thermoplastic Vulcanizates With Good Elastic Recovery and Heat Stability at Elevated Temperature, Jushik Yun, Raman Patel, and Darnell C. Worley II, Society of Plastics Engineers, 7th Thermoplastic Elastomers Topical Conference 2005—Expanding Materials Applications and Markets (2005), 8 pgs.

High-Performance Styrenic Thermoplastic Vulcanizates for Long-Term Application, Jushik Yun, Raman Patel, and Darnell C. Worley II, Journal of Applied Polymer Science, vol. 105, (2007), pp. 2996-3005.

High Performance Thermoplastic Vulcanizate made by a Novel Hydrogenated Styrenic Block Copolymer/Polypropylene Blends, Eiji Nakamura, Kenji Shachi, ACS Rubber Division, (2005), paper 80, 10 pgs.

Styrene-Butadiene Random Copolymer as Performance Enhancing Additive in Thermoplastic Elastomers, Ajbani M, Kiehl C, and Takacs A., ACS Rubber Division, (2003), paper 5, 8 pgs.

High Temperature Performance of SEBS based Compounds, E. Colchen, and Hde Groot, TPE 2008, TPE in der Prozesskette, VDI-Gesellschaft Kunststofftechnik, vol. 4292, (2008), pp. 149-161.

Innovative Solutions for Achieving High Temperature Performance with Styrenic TPEs, Kathryn J. Wright, and Henk de Groot, ACS Rubber Division, Paper 2, (2008), 25 pgs.

Mechanical property modification and morphology of poly (styrene-b-hydrogenated butadiene-b-styrene) poly (hydrogenated butadiene) blends, J.P. Baetzold, I. Gancarz, X. Quan, and J.T. Koberstein, Macromolecules, (1994), pp. 5329-5340.

New TPEs Partially Crosslinked Using Functionalised Random Copolymers, Daniel Milesi, (CT)New opportunities for thermoplastic elastomers, (2000), pp. 11.1-11.3.

Performance Enhancing Crosslinked SBR Masterbatches for Thermoplastic Elastomers, Manoj Ajbani and Chris Kiehl, Annual Technical Conference—ANTEC, Conference Proceedings, (2004), vol. 3, pp. 4182-4186.

Polypropylene/talc/SEBS (SEBS-g-MA) composites. Polypropylene/talc/SEBS (SEBS-g-MA) composites. Part 2. Mechanical properties, Matjaz Denac, Vojko Musil, Ivan Smit, Composites Part A (Applied Science and Manufacturing), (2005), vol. 36, pp. 1282-1290.

Recent development in styrenic block copolymer technology, Bing Yang, Society of Plastics Engineers, 7th Thermoplastic Elastomers Topical Conference 2005—Expanding Materials Applications and Markets, (2005), 4 pgs.

Septon V—A HSBC (hydrogenated styrenic block co-polymer) with reactive hard blocks, Katsunori Takamoto and Ralph Bohm, Rubber Fiber and Plastics, (2005), pp. 249-254. (with partial translation).

Study of the Characteristics of Thermoplastic Vulcanizates of PP/SEPS/SBS Blends, Michihisa Tasaka and Shinzo Saito, Riken Vinyl Industry Co., (2000), 5 pgs.

Time dependent deformation behavior of thermoplastic elastomers, H.H. Lee, Th. Lupke, T. Pham, H-J Radusch, Polymer 44, No. 16, (2003), pp. 4589-4597.

TPEs are creating value throughout the world, R. Eller, Modern Plastics World Encyclopedia, (2006), p. 107-108.

Radiation Effects on SBR-EPDM Blends: A Correlation with Blend Morphology, K. A. Dubey et al., Journal of Polymer Science: Part B: Polymer Physics, 2006, vol. 44, pp. 1676-1689.

International Search Report, PCT/US2010/062430, dated Sep. 16, 2011 (4 pages).

Ferdous Khan et al., "Photochemical crosslinking of ethylene-vinyl-acetate and ethylene-propylene-diene terpolymer blends," //www.elsevier.com/locate/polydegstab//, Elsevier, Polymer Degradation and Stability, vol. 93, Issue 6, dated 20008, pp. 1238-1241.

(56) References Cited

OTHER PUBLICATIONS

S.M.A. Salehi et al., "Effects of High-Energy Electron Beam on Low-Density Polyethylene Materials Containing EVA," Journal of Applied Polymer Science, vol. 92, Wiley Periodicals, Inc., dated 2004, pp. 1049-1052.

AdvantaFlex Biopharmaceutical Grade Tubing, Tech Sheet, <http://www.advantapure.com>, AdvantaPure, New Age Industries, Inc., dated 2011, 4 pages.

C-Flex Ultra Biopharmaceutical Pump Tubing, <http://www.biopharm.saint-gobain.com/en/Products.asp?ID=70>, Saint-Gobain Performance Plastics Corporation, dated 2011, 3 pages.

C-Flex Thermoplastic Elastomer, Biopharmaceutical Products, <http://biopharm.saint-gobain.com>, Saint-Gobain Performance Plastics Corporation, dated 2011, 4 pgs.

The International Search Report and the Written Opinion for International Application No. PCT/US2013/043715 received from the International Searching Authority (ISR/KR), dated Aug. 27, 2013, 16 pages.

Yang Mingshan et al., "Modem Engineering Plastic Modification—Theory and Practice," China Light Industry Press, pp. 90 and 91, Jul. 31, 2009.

European Search Report issued in Application No. 13801235.6, dated Jan. 11, 2016, 2 pages.

Geng Xiaozheng, "Twin screw extruder and its use," Jan. 2003, pp. 341 and 342, China Light Industry Press.

\* cited by examiner

THERMOPLASTIC ELASTOMER TUBING AND METHOD TO MAKE AND USE SAME

CROSS-REFERENCE TO RELATED APPLICATION

The present application is a continuation and claims priority to U.S. patent application Ser. No. 13/907,488 entitled "Thermoplastic Elastomer Tubing And Method To Make And Use Same," by Sridhar Krishnamurthi Siddhamalli et al., filed May 31, 2013, which application claims priority under 35 U.S.C. § 119(e) to U.S. Provisional Patent Application Ser. No. 61/656,402 entitled "Thermoplastic Elastomer Tubing And Method To Make And Use Same," by Sridhar Krishnamurthi Siddhamalli et al., filed Jun. 6, 2012, of which both applications are assigned to the current assignee hereof and incorporated herein by reference in their entirety.

BACKGROUND

Many industries utilize tubing to dispense fluid or remove fluid. For example, the biopharmaceutical industry, the medical industry and the food and beverage industry utilize tubing for the transfer of fluids. In various situations, thermoplastic elastomer tubing is used for fluid transfer.

Typically, thermoplastic elastomer tubing is formed from pellets of one or more of the starting materials. In some cases, the pellets are formed by combining powders of one or more of the starting materials, such as a powder of a thermoplastic component of the tubing and a powder of an elastomer component of the tubing. The combined powders are then melted and, in some situations, the melt can be extruded and cut into pellets of a particular size. In certain scenarios, the pellets can be subjected to an additional pelletizing process involving a second melt operation, a second extrusion operation, and a second cutting operation. The pellets may then undergo an additional melt process and be combined with other starting materials to be extruded to form thermoplastic elastomer tubing.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The disclosure generally relates to thermoplastic elastomer tubing, and processes to make thermoplastic elastomer tubing. In particular, embodiments are described herein that eliminate certain steps from a conventional thermoplastic elastomer tubing manufacturing process. For example, processes described herein eliminate pre-mixing and pelletizing operations of conventional thermoplastic elastomer tubing manufacturing processes. Thus, the production of thermoplastic elastomer tubing is more efficient and cost-effective. Thermoplastic elastomer tubing produced according to embodiments described herein can also have improved properties over thermoplastic elastomer tubing formed according to conventional processes.

In an embodiment, a thermoplastic elastomer tube includes a thermoplastic elastomer component disposed within a matrix. The thermoplastic elastomer component can be disposed in the matrix as a thermoplastic elastomer phase having a number of domains. At least approximately 50% of the domains of the thermoplastic elastomer phase may have an aspect ratio of no greater than approximately 1.5. Aspect ratio as used herein with respect to domains of phases of thermoplastic elastomer tubes refers to a value of a major dimension of a particular domain divided by a value of a minor dimension of the particular domain. The minor dimension can be measured along an axis perpendicular to an axis along which the major dimension is measured.

In another embodiment, a thermoplastic elastomer tube includes a thermoplastic elastomer component having at least a polymeric portion. A molecular weight of the polymeric portion can be at least approximately 70% of a molecular weight of an unprocessed sample of the polymeric portion. The molecular weight can be a number average molecular weight (Mn), a weight average molecular weight (Mw), a Z-average molecular weight (Mz), a peak molecular weight (Mp), or a combination thereof.

In an additional embodiment, a thermoplastic elastomer tube includes at least approximately 20 wt % of a thermoplastic elastomer component comprising styrene. The thermoplastic elastomer tube can also include no greater than approximately 50 wt % of a polyolefin component. Further, the thermoplastic elastomer tube can have a tensile strength of at least approximately 1000 psi. In a particular embodiment, the thermoplastic elastomer tube can be coupled to a pump to transfer fluid.

Figure 1:
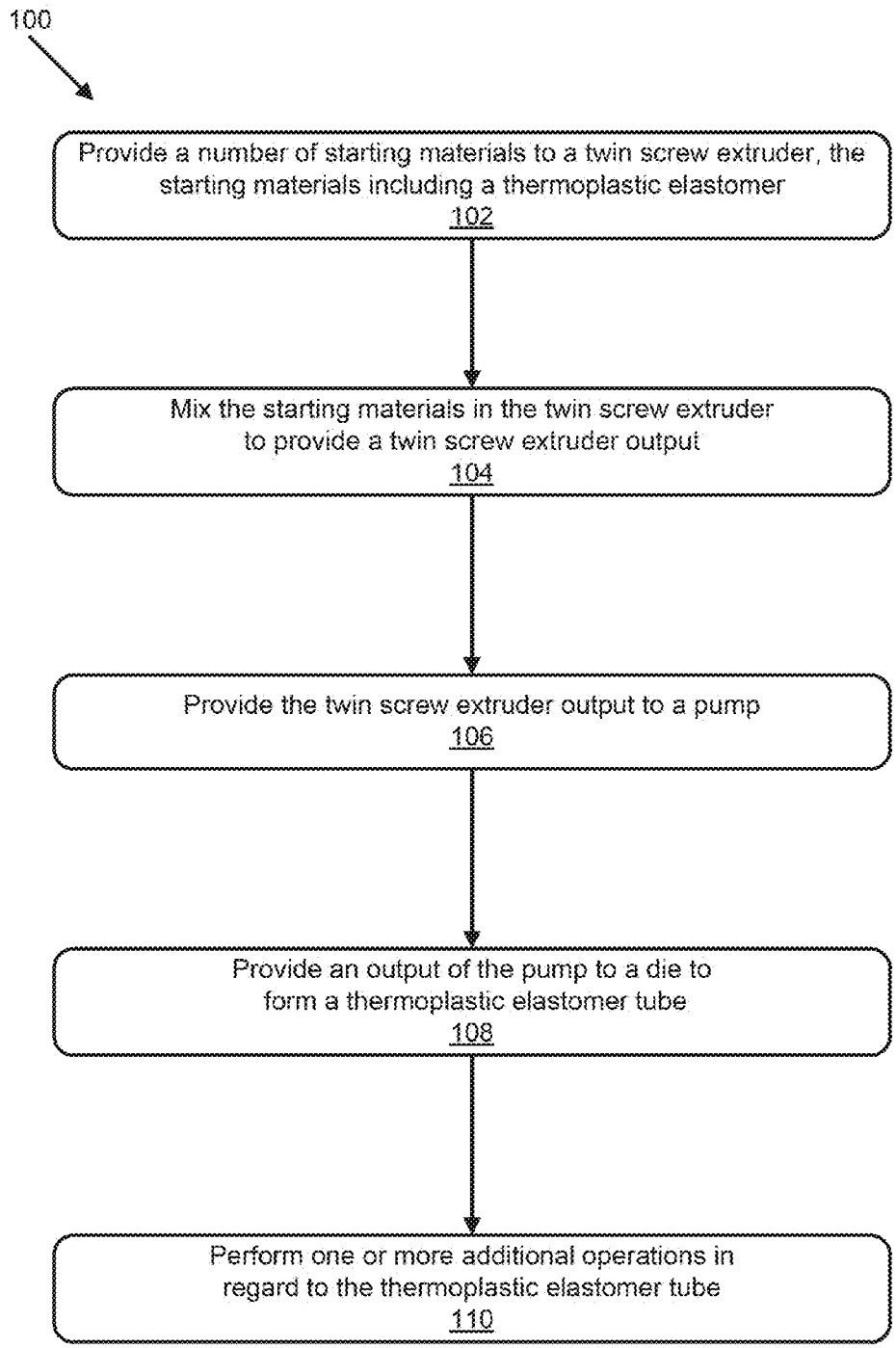
FIG. 1 is a flow diagram of a process to make thermoplastic elastomer tubing according to an embodiment.

FIG. 1 is a flow diagram of a process 100 to make thermoplastic elastomer tubing according to an embodiment. At 102, the process 100 includes providing a number of starting materials to a twin screw extruder. The starting materials can include a thermoplastic elastomer. The thermoplastic elastomer can include a thermoplastic component and an elastomeric component. In particular embodiments, a composition of the starting materials can vary depending on a type of the thermoplastic elastomer. A type of the thermoplastic elastomer can include styrenic block co-polymer, thermoplastic polyolefin, thermoplastic polyurethane, thermoplastic vulcanizate, co-polyester elastomer, flexible polyvinylchloride, or co-polyamide elastomer. The starting materials can also include one or more additives. The additives can include a stabilizer, a curing agent, a lubricant, a filler, a processing aid, a colorant, a catalyst, a blowing agent, a foaming agent, another polymer as a minor component, or combinations thereof. Additionally, one or more of the starting materials can be in the form of a solid, a liquid, or a gas.

At 104, the starting materials are mixed in the twin screw extruder to provide a twin screw extruder output. In addition, to mixing the starting materials, the twin screw extruder can heat the starting materials. In a particular embodiment, the twin screw extruder can melt one or more of the solid starting materials, such as the components of the thermoplastic elastomer.

At 106, the twin screw extruder output can be provided to a pump. The pump can include a gear pump, a positive displacement pump, a single screw extruder, or another suitable type of pump. At 108, the output of the pump is provided to a die and mandrel to form a thermoplastic elastomer tube. In some embodiments, the output of the pump is provided directly to the die and mandrel. In other embodiments, the output of the pump can pass through one or more filters to remove contaminants and/or provide back mixing before being provided to the die and mandrel. In certain instances, the one or more filters can include one or more wire-mesh screens.

In addition, at 110, the process 100 includes performing one or more additional operations in regard to the thermoplastic elastomer tube. For example, the thermoplastic elastomer tube can be subjected to a cooling process, a drying process, a coiling process, a cutting process, or a combination thereof. In some instances, dimensions of the thermoplastic elastomer tube can be measured, such as via a laser sensor, an ultrasonic sensor, or an X-ray device. The measurements of the dimensions of the thermoplastic elastomer tube can be provided as feedback information to a control system. The control system can then utilize the feedback information to adjust the operation of one or more devices used to form the thermoplastic elastomer tube, such as the twin screw extruder, the pump, a cooling bath, or combinations thereof.

Figure 2:
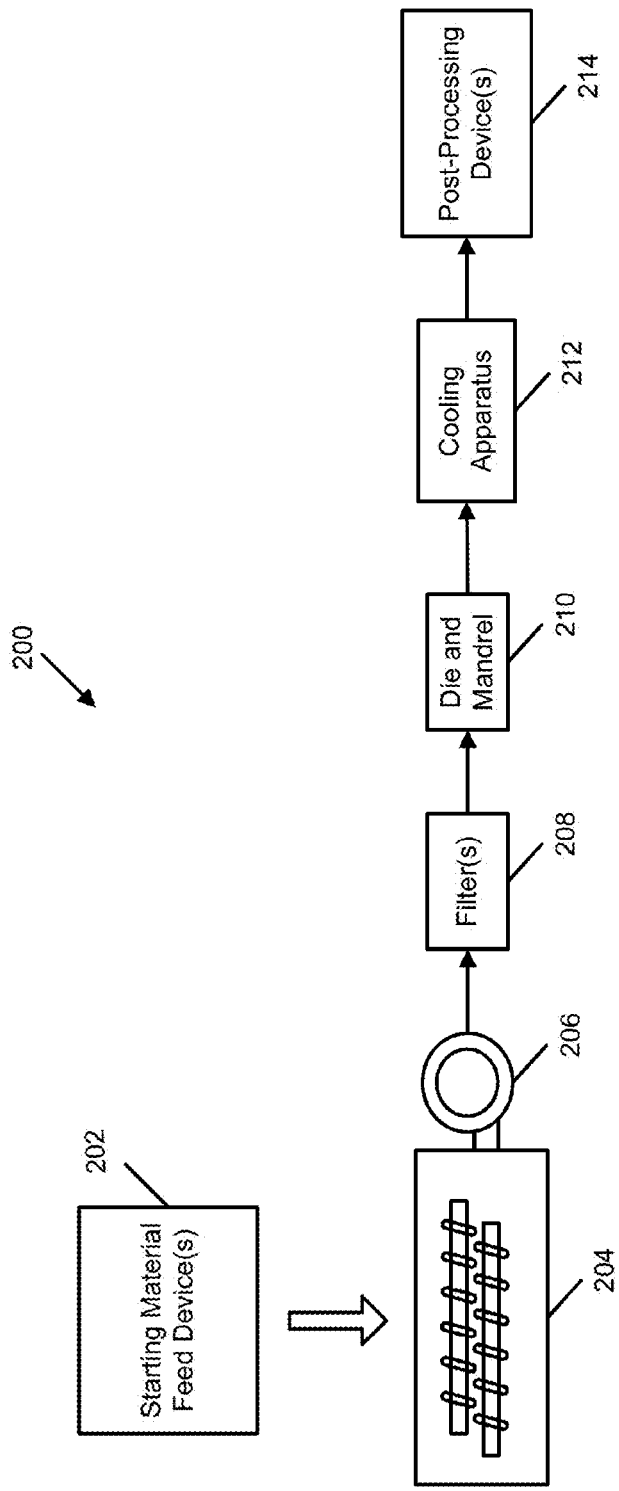
FIG. 2 is a diagram of an embodiment of a system to make thermoplastic elastomer tubing.

FIG. 2 is a diagram of an embodiment of a system 200 to make thermoplastic elastomer tubing. In a particular embodiment, the system 200 can implement the process 100 to form thermoplastic elastomer tubes.

The system 200 can include one or more starting material feed devices 202 to provide starting materials to a twin screw extruder 204. Each of the starting materials can be in a particular form of matter, such as a solid, a liquid, a gas, or a combination thereof.

The starting materials can include components of thermoplastic elastomer tubing. In an embodiment, the starting materials can include a thermoplastic elastomer component. The thermoplastic elastomer component can include a mixture of a plurality of polymers. In some instances, the thermoplastic elastomer component is selected from a group containing a polyether-ester block co-polymer, a thermoplastic polyamide elastomer, a thermoplastic polyurethane elastomer, a thermoplastic polyolefin elastomer, a thermoplastic vulcanizate, an olefin-based co-polymer, an olefin-based ter-polymer, a polyolefin plastomer, or combinations thereof.

Additionally, the thermoplastic elastomer component can include a particular co-polymer. For example, the co-polymer can include a block co-polymer. In an embodiment, the block co-polymer can include a mixture of a plurality of formulations of block co-polymers including styrene. In a particular embodiment, the block co-polymer is selected from a group containing a styrene-butadiene-styrene block co-polymer, a styrene-isoprene-styrene block co-polymer, a styrene-isoprene-butadiene block co-polymer, a hydrogenated block co-polymer, or combinations thereof. In particular embodiments, the hydrogenated block co-polymer can include a styrene-ethylene-butylene-styrene (SEBS) block co-polymer, a styrene-ethylene-propylene-styrene (SEPS) block co-polymer, a styrene-ethylene-ethylene/propylene-styrene (SEEPS) block co-polymer, or combinations thereof.

The components of the thermoplastic elastomer tubing can also include a polyolefin component. The polyolefin component can include a mixture of a plurality of formulations of polyolefins. In a particular embodiment, the polyolefin component includes polypropylene.

Further, the starting materials for the thermoplastic elastomer tubing can include one or more additives. For example, the one or more additives can include a plasticizer, a catalyst, a silicone modifier, a stabilizer, a curing agent, a lubricant, a colorant, a filler, a blowing agent, another polymer as a minor component, or a combination thereof. In a particular embodiment, the plasticizer can include mineral oil.

In certain instances, the one or more starting material feed devices 202 can include one or more liquid injection pumps to provide liquid starting materials to the twin screw extruder 204. Additionally, the one or more starting material feed devices 202 can include one or more feeders coupled to the twin screw extruder 204 to provide solid starting materials to the twin screw extruder 204. In some embodiments, pellets, powders, or both, comprising one or more of the starting materials can be provided to the twin screw extruder 204 via a feeder. Further, starting materials in the form of strips, such as strips of thermoplastic elastomer components, can be provided to the twin screw extruder 204 via a feeder. The starting material feed devices 202 can also include gas injection devices to provide starting materials in the form of a gas to the twin screw extruder 204. In a particular embodiment, at least a portion of the starting materials can also be provided to the twin screw extruder 204 via a side feeder of the twin screw extruder 204. In addition, a number of the starting materials can be blended before being provided to the twin screw extruder 204. In an embodiment, at least one of the starting material feed devices 202 includes a mixing apparatus, a blending apparatus, or a combination thereof.

The twin screw extruder 204 can provide mixing of the starting materials. Additionally, the twin screw extruder 204 can heat the starting materials. In certain instances, the twin screw extruder 204 can have a number of heating zones, where each heating zone is associated with a specified temperature. For example, in an embodiment, the twin screw extruder 204 can operate at temperatures above a melting point of one or more of the starting materials, such that the starting materials form a melt within the twin screw extruder 204. The temperature profile of the twin screw extruder 204 can include temperatures within a range of approximately 125° C. to approximately 230° C. In a particular illustrative embodiment, the twin screw extruder 204 can operate with a temperature profile having temperatures within a range of approximately 150° C. to approximately 180° C. Additionally, the twin screw extruder 204 can be operated such that the maximum temperature of the melt within the twin screw extruder 204 may be no greater than approximately 205° C., no greater than approximately 195° C., no greater than approximately 190° C., no greater than approximately 185° C., no greater than approximately 175° C., or no greater than approximately 160° C.

Further, the twin screw extruder 204 can operate with a screw speed that varies across a range of speeds based on a formulation of the thermoplastic elastomer tubing being made, settings for process parameters of the system 200, or a combination thereof. For example, the speed of the twin screw extruder 204 can be within a range of approximately 50 rotations per minute (rpm) to approximately 1150 rpm. In a particular illustrative embodiment, the speed of the twin screw extruder 204 can be within a range of approximately 450 rpm to approximately 550 rpm.

In addition, the twin screw extruder 204 can operate at a torque that varies across a range of torques based on a formulation of the thermoplastic elastomer tubing being made, settings for process parameters of the system 200, or a combination thereof. For example, the torque of the twin screw extruder 204 can be within a range of approximately 10% to approximately 90%. In a particular illustrative embodiment, the torque of the twin screw extruder 204 can be within a range of approximately 30% to approximately 45%.

The system 200 also includes a pump 206 that receives the output from the twin screw extruder 204. In one embodiment, the pump 206 can be a gear pump. In another embodiment, the pump 206 can be a positive displacement pump. In a particular embodiment, the positive displacement pump can be a melt pump. In an additional embodiment, the pump 206 can be a single screw extruder. The single screw extruder can have a ratio of length to diameter of no greater than approximately 24, no greater than approximately 16, or no greater than approximately 8.

A speed of the gear pump 206 can vary across a range of speeds based on a formulation of the thermoplastic elastomer tubing being made, settings for process parameters of the system 200, or a combination thereof. For example, the speed of the gear pump 206 can be within a range of approximately 10 rpm to approximately 100 rpm. In a particular illustrative embodiment, the speed of the gear pump 206 can be within a range of approximately 12 rpm to approximately 30 rpm.

In an embodiment, an output rate of the gear pump 206 can vary across a range of output rates based on a formulation of the thermoplastic elastomer tubing being made, settings for process parameters of the system 200, or a combination thereof. For example, the output rate of the gear pump 206 can be within a range of approximately 5 lbs./hr. to approximately 250 lbs./hr. In a particular illustrative embodiment, the output rate of the gear pump 206 can be within a range of approximately 15 lbs./hr. to approximately 25 lbs./hr. In some embodiments, the output rate of the gear pump 206 can be even higher depending on the screw size of the twin screw extruder 204. To illustrate, the output rate of the gear pump 206 can be up to approximately 1000 lbs./hr.

Additionally, the system 200 includes one or more filters 208. The one or more filters 208 can provide filtering of the output of the pump 206 and also provide additional mixing of the output of the pump 206. In some cases, the one or more filters 208 can include wire-mesh screens.

Further, the system 200 includes a die and mandrel 210 to form thermoplastic elastomer tubing via extrusion of the output of the pump 206. In an embodiment, a pressure at the input of the die and mandrel 210 varies by no greater than approximately 10% from a specified pressure, no greater than approximately 8% from the specified pressure, no greater than approximately 6% from the specified pressure, no greater than approximately 4% from the specified pressure, or no greater than approximately 2% from the specified pressure.

The pressure at the input of the die and mandrel 210 can vary across a range of pressures based on a size of the die and mandrel 210, dimensions of the tubing being formed, cross-sectional geometry of the die and mandrel 210, settings for process parameters of the system 200, or a combination thereof. For example, the pressure at the input of the die and mandrel 210 can be within a range of approximately 1 psi to approximately 1000 psi. In a particular illustrative embodiment, the pressure at the input of the die and mandrel 210 is at least approximately 485 psi, at least approximately 492 psi, at least approximately 495 psi, or at least approximately 505 psi. In another particular illustrative embodiment, the pressure at the input of the die and mandrel 210 may also be no greater than approximately 525 psi, no greater than approximately 515 psi, no greater than approximately 511 psi, no greater than approximately 504 psi, no greater than approximately 500 psi, or no greater than approximately 495 psi. It will be appreciated that the pressure at the input of the die and mandrel 210 can be within a range between any of the values noted above.

After being formed via the die and mandrel 210, thermoplastic elastomer tubing can be cooled via a cooling apparatus 212. In an embodiment, the cooling apparatus 212 can include a water bath. In some embodiments, the water bath can be disposed in a vacuum tank, the water bath can be open to the air, or both.

The system 200 can also include one or more post-processing devices 214 that subject the thermoplastic elastomer tubing to one or more post-processing operations. For example, the one or more post-processing devices 214 can include a cutting device to cut the thermoplastic elastomer tubing into a number of distinct tubes. In another case, the one or more post-processing devices 214 can include a coiling device to wrap the thermoplastic elastomer tubing into a coil. Furthermore, the one or more post-processing device 214 can include a drying device, such as a heater, a curing apparatus, such as a curing oven, or a combination thereof.

In an illustrative embodiment, the thermoplastic elastomer tubing formed according to embodiments of the process 200 can include at least approximately 20 wt % of a thermoplastic elastomer component. In an embodiment, the thermoplastic elastomer component can include styrene. In one embodiment, thermoplastic elastomer tubing can include at least approximately 25 wt % of the thermoplastic elastomer component, at least approximately 30 wt % of the thermoplastic elastomer component, at least approximately 33 wt % of the thermoplastic elastomer component, at least approximately 38 wt % of the thermoplastic elastomer component, or at least approximately 45 wt % of the thermoplastic elastomer component. In another embodiment, the thermoplastic elastomer tubing may include no greater than approximately 60 wt % of the thermoplastic elastomer component, no greater than approximately 55 wt % of the thermoplastic elastomer component, no greater than approximately 48 wt % of the thermoplastic elastomer component, or no greater than approximately 40 wt % of the thermoplastic elastomer component. It will be appreciated that amount of the thermoplastic elastomer component can be within a range between any of the values noted above. In a particular embodiment, the thermoplastic elastomer tubing can include the thermoplastic elastomer component within a range of approximately 25 wt % to approximately 45 wt %.

Additionally, the thermoplastic elastomer tubing formed according to embodiments of the process described with respect to FIG. 2 can include no greater than approximately 50 wt % of a polyolefin component. In one embodiment, the thermoplastic elastomer tubing can include at least approximately 8 wt % of the polyolefin component, at least approximately 10 wt % of the polyolefin component, at least approximately 15 wt % of the polyolefin component, at least approximately 20 wt % of the polyolefin component, at least approximately 23 wt % of the polyolefin component, at least approximately 27 wt % of the polyolefin component, or at least approximately 30 wt % of the polyolefin component. In another embodiment, the thermoplastic elastomer tubing can include no greater than approximately 45 wt % of the polyolefin component, no greater than approximately 42 wt % of the polyolefin component, no greater than approximately 40 wt % of the polyolefin component, no greater than approximately 35 wt % of the polyolefin component, no greater than approximately 33 wt % of the polyolefin component, or no greater than approximately 25 wt % of the polyolefin component. It will be appreciated that the amount of the polyolefin component can be within a range between any of the values noted above. In a particular embodiment, the thermoplastic elastomer tubing can include the polyolefin component within a range of approximately 10 wt % to approximately 30 wt %.

In some embodiments, thermoplastic elastomer tubing formed according to embodiments of the process 200 can include mineral oil as a plasticizer. In one embodiment, the thermoplastic elastomer tubing can include at least approximately 1 wt % mineral oil, at least approximately 20 wt % mineral oil, at least approximately 32 wt % mineral oil, at least approximately 40 wt % mineral oil, at least approximately 42 wt % mineral oil, or at least approximately 50 wt % mineral oil. In an additional embodiment, the thermoplastic elastomer tubing can include no greater than approximately 70 wt % mineral oil, no greater than approximately 60 wt % mineral oil, no greater than approximately 48 wt % mineral oil, no greater than approximately 45 wt % mineral oil, or no greater than approximately 35 wt % mineral oil. It will be appreciated that amount of mineral oil can be within a range between any of the values noted above. In a particular embodiment, the thermoplastic elastomer tubing can include mineral oil within a range of approximately 35 wt % to approximately 55 wt %.

In certain embodiments, the thermoplastic elastomer tubing made according to the process 200 can have a particular dimensional accuracy. Accordingly, particular dimensions of the thermoplastic elastomer tubing may vary by a specified amount over the length of the thermoplastic elastomer tubing or over a number of thermoplastic tubes formed from the thermoplastic elastomer tubing. In one embodiment, the dimensional accuracy of the thermoplastic elastomer tubing can be expressed as the outer diameter of the thermoplastic elastomer tubing having a standard deviation of no greater than approximately 1.5% of an average outer diameter of the thermoplastic elastomer tubing over a specified length.

Figure 3:
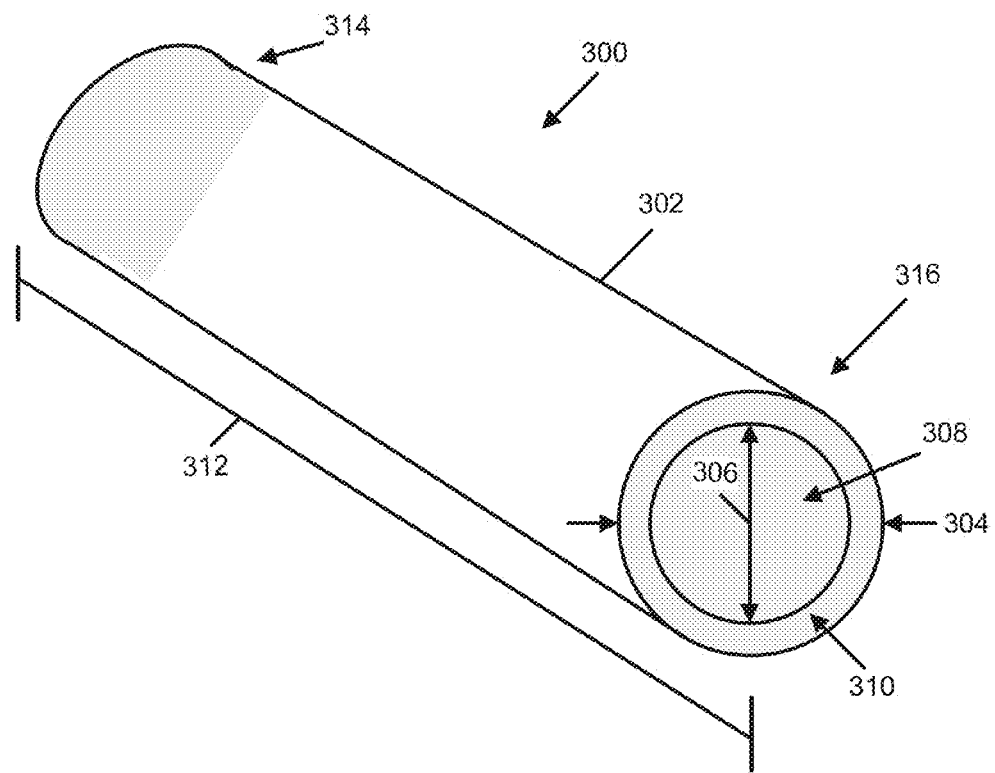
FIG. 3 is a view of a thermoplastic elastomer tube according to an embodiment.

FIG. 3 is a view of a thermoplastic elastomer tube 300 according to an embodiment. In a particular embodiment, the thermoplastic elastomer tube 300 can be formed according to the process 100 described previously with respect to FIG. 1, by the system 200 described previously with respect to FIG. 2, or both.

The thermoplastic elastomer tube 300 can include a body 302 having an outer diameter 304 and an inner diameter 306. The inner diameter 306 can form a hollow bore 308 of the body 302. In addition, the body 302 can include a wall thickness 310 that is measured by the difference between the outer diameter 304 and the inner diameter 306. Further, the body 302 can have a length 312.

In a particular embodiment, the outer diameter 304 can be at least approximately 2 mm, at least approximately 5 mm, at least approximately 12 mm, at least approximately 15 mm, at least approximately 18 mm, at least approximately 20 mm, or at least approximately 22 mm. Additionally, the outer diameter 304 may be no greater than approximately 40 mm, no greater than approximately 33 mm, no greater than approximately 30 mm, no greater than approximately 25 mm, no greater than approximately 16 mm, or no greater than approximately 10 mm. It will be appreciated that the outer diameter 304 can be within a range between any of the values noted above.

In another embodiment, the inner diameter 306 of the body 302 can be at least approximately 0.5 mm, at least approximately 3 mm, at least approximately 5 mm, at least approximately 9 mm, at least approximately 15 mm, or at least approximately 22 mm. Further, the inner diameter 306 may be no greater than approximately 28 mm, no greater than approximately 25 mm, no greater than approximately 20 mm, no greater than approximately 17 mm, no greater than approximately 12 mm, or no greater than approximately 10 mm. It will be appreciated that the inner diameter 306 can be within a range between any of the values noted above.

The thermoplastic elastomer tube 302 can also have a wall thickness that is the difference between the outer diameter 304 and the inner diameter 306. In some embodiments, the wall thickness can be at least approximately 0.5 mm, at least approximately 2 mm, at least approximately 5 mm, or at least approximately 7 mm. Additionally, the wall thickness may be no greater than approximately 17 mm, no greater than approximately 15 mm, no greater than approximately 12 mm, or no greater than approximately 10 mm. It will be appreciated that the wall thickness can be within a range between any of the values noted above.

In a further embodiment, the length 312 of the body 302 can be at least approximately 5 cm, at least approximately 25 cm, at least approximately 35 cm, or at least approximately 45 cm. The length 312 can also be no greater than approximately 100 cm, no greater than approximately 80 cm, no greater than approximately 65 cm, or no greater than approximately 55 cm. It will be appreciated that the length 312 can be within a range between any of the values noted above.

In some embodiments, the thermoplastic elastomer tube 302 can be formed from a length of thermoplastic elastomer tubing that is greater than the length of a single tube. For example, in one embodiment, the thermoplastic elastomer tubing used to provide the thermoplastic elastomer tube 302 can have a length that is at least approximately 10 m, at least approximately 35 m, at least approximately 50 m, at least approximately 125 m, at least approximately 350 m, or at least approximately 500 m. In another embodiment, the thermoplastic elastomer tubing may have a length that is no greater than approximately 800 m, no greater than approximately 650 m, no greater than approximately 400 m, no greater than approximately 200 m, or no greater than approximately 75 m.

Although the cross-section of the inner bore 306 perpendicular to an axial direction of the body 302 in the illustrative embodiment shown in FIG. 3 has a circular shape, the cross-section of the inner bore 306 perpendicular to the axial direction of the body 302 can have a square shape, a triangular shape, or a rectangular shape.

Furthermore, although the thermoplastic elastomer tube 300 of the illustrative embodiment shown in FIG. 3 has a single lumen comprising the hollow bore 308, in other embodiments, the thermoplastic elastomer tube 300 can have a plurality of lumen. In addition, each of the respective lumen of the plurality of lumen can have an inner diameter.

The thermoplastic elastomer tube 300 can have particular values for certain physical properties. For example, in certain embodiments, the thermoplastic elastomer tube 300 can have a tensile strength of at least approximately 1000 psi, at least approximately 1250 psi, at least approximately 1500 psi, at least approximately 1750 psi, at least approximately 1800 psi, at least approximately 1820 psi, at least approximately 1900 psi, or at least approximately 1930 psi. Further, the thermoplastic elastomer tube 300 may have a tensile strength no greater than approximately 2150 psi, no greater than approximately 2100 psi, no greater than approximately 1970 psi, no greater than approximately 1950 psi, no greater than approximately 1880 psi, or no greater than approximately 1850 psi. It will be appreciated that the tensile strength can be within a range between any of the values noted above. In a particular embodiment, the thermoplastic elastomer tube 300 can have a tensile strength within a range of approximately 1950 psi to approximately 2000 psi.

In addition, the thermoplastic elastomer tube 300 can have a 100% elongation modulus of at least approximately 400 psi, at least approximately 425 psi, at least approximately 435 psi, at least approximately 460 psi, or at least approximately 470 psi. The thermoplastic elastomer tube 300 may also have a 100% elongation modulus of no greater than approximately 510 psi, no greater than approximately 500 psi, no greater than approximately 475 psi, no greater than approximately 450 psi, or no greater than approximately 430 psi. It will be appreciated that the 100% elongation modulus can be within a range between any of the values noted above. In a particular embodiment, the thermoplastic elastomer tube 300 can have a 100% elongation modulus within a range of approximately 440 psi to approximately 470 psi.

In some embodiments, the thermoplastic elastomer tube 300 can have a 300% elongation modulus of at least approximately 600 psi, at least approximately 630 psi, at least approximately 660 psi, or at least approximately 680 psi. In other embodiments, the thermoplastic elastomer tube 300 may have a 300% elongation modulus of no greater than approximately 700 psi, no greater than approximately 675 psi, no greater than approximately 650 psi, or no greater than approximately 625 psi. It will be appreciated that the 300% elongation modulus can be within a range between any of the values noted above. In a particular embodiment, the 300% elongation modulus can be within a range of approximately 640 psi to approximately 670 psi.

In addition, the thermoplastic elastomer tube 300 can have a Graves tear strength of at least approximately 180 pounds per linear inch (pli), at least approximately 200 pli, at least approximately 220 pli, or at least approximately 250 pli. The thermoplastic elastomer tube 300 may also have a Graves tear strength of no greater than approximately 270 pli, no greater than approximately 260 pli, no greater than approximately 235 pli, or no greater than approximately 225 pli. It will be appreciated that the Graves tear strength can be within a range between any of the values noted above. In a particular embodiment, the Graves tear strength can be within a range of approximately 210 pli to approximately 240 pli.

In certain instances, the thermoplastic elastomer tube 300 can have a burst pressure of at least approximately 65 psi, at least approximately 70 psi, at least approximately 80 psi, or at least approximately 90 psi. In other instances, the thermoplastic elastomer tube 300 may have a burst pressure no greater than approximately 100 psi, no greater than approximately 95 psi, no greater than approximately 85 psi, or no greater than approximately 75 psi. It will be appreciated that the burst pressure can be within a range between any of the values noted above. In a particular embodiment, the burst pressure can be within a range of approximately 75 psi to approximately 95 psi.

In an embodiment, the thermoplastic elastomer tube 300 can have a shore A hardness of at least approximately 40, at least approximately 45, at least approximately 55, at least approximately 60, or at least approximately 70. In another embodiment, the thermoplastic elastomer tube 300 may have a shore A hardness of no greater than approximately 80, no greater than approximately 75, no greater than approximately 65, or no greater than approximately 50. It will be appreciated that the shore A hardness can be within a range between any of the values noted above. In a particular embodiment, the shore A hardness can be within a range of approximately 50 to approximately 65.

Furthermore, the thermoplastic elastomer tube 300 can have an enthalpy of mixing of at least approximately 15 J/g, at least approximately 16.5 J/g, at least approximately 18 J/g, or at least approximately 19 J/g. The thermoplastic elastomer tube 300 may also have an enthalpy of mixing of no greater than approximately 21 J/g, no greater than approximately 20 J/g, no greater than approximately 17.5 J/g, or no greater than approximately 16 J/g. It will be appreciated that the enthalpy of mixing can be within a range between any of the values noted above. In a particular embodiment, the enthalpy of mixing can be within a range of approximately 16 J/g to approximately 18.5 J/g.

In certain embodiments, the thermoplastic elastomer tube 300 can include a thermoplastic elastomer component that has a polymeric portion. In some embodiments, the molecular weight of the polymeric portion can be at least approximately 70% of an unprocessed sample of the polymeric portion. In one embodiment, the molecular weight of the polymeric portion is at least approximately 75% of the molecular weight of the unprocessed sample of the polymeric portion, at least approximately 80% of the molecular weight of the unprocessed sample of the polymeric portion, or at least approximately 90% of the molecular weight of the unprocessed sample of the polymeric portion. In another embodiment, the molecular weight of the polymeric portion may be no greater than approximately 95% of the molecular weight of the unprocessed sample of the polymeric portion, no greater than approximately 92% of the unprocessed sample of the polymeric portion, no greater than approximately 88% of the unprocessed sample of the polymeric portion, or no greater than approximately 85% of the unprocessed sample of the polymeric portion.

Additionally, the molecular weight of the polymeric portion of the thermoplastic elastomer tube 300 can be at least approximately 120,000, at least approximately 135,000, at least approximately 150,000, or at least approximately 165,000. Further the molecular weight of the polymeric portion may be no greater than approximately 275,000, no greater than approximately 230,000, no greater than approximately 210,000, no greater than approximately 190,000, or no greater than approximately 175,000. It will be appreciated that the molecular weight of the polymeric portion can be within a range between any of the values noted above. In a particular embodiment, the molecular weight of the polymeric portion of a thermoplastic elastomer component of the thermoplastic elastomer tube 300 can be within a range of approximately 140,000 to approximately 180,000.

Furthermore, the molecular weight of the unprocessed sample of the polymeric portion can be at least approximately 150,000, at least approximately 165,000, at least approximately 175,000, or at least approximately 185,000. In another embodiment, the molecular weight of the unprocessed sample of the polymeric portion may be no greater than approximately 300,000, no greater than approximately 255,000, no greater than approximately 210,000, or no greater than approximately 180,000. It will be appreciated that the molecular weight of the unprocessed sample of the polymeric portion can be within a range between any of the values noted above. In a particular embodiment, the molecular weight of the unprocessed sample of the polymeric portion can be within a range of approximately 160,000 to approximately 200,000.

The physical properties of the thermoplastic elastomer tube 300 can be measured according to particular techniques. For example, the tensile strength, the 100% elongation modulus, and the 300% elongation modulus can be measured according to the ASTM D412 standard at the time of filing of this patent application. Further, the Graves tear strength can be measured according to the ASTM D624 standard at the time of filing of this patent application. The burst pressure can be measured according to the ASTM D1599 standard at the time of filing this patent application. In addition, the Shore A hardness can be measured according to the ASTM D2240 type A standard at the time of filing of this patent application. The enthalpy of mixing can be measured using a differential scanning calorimetry (DSC) technique. The molecular weight of the thermoplastic elastomer tube 300 can be measured using gel permeation chromatography.

In some embodiments, the thermoplastic elastomer tube 300 can have a particular morphology. In one embodiment, the thermoplastic elastomer tube 300 can have a thermoplastic elastomer phase. The thermoplastic elastomer phase can include one or more thermoplastic elastomer components. Additionally, the thermoplastic elastomer phase includes a number of domains of the one or more thermoplastic elastomer components. The thermoplastic elastomer phase can also include a number of other components, such as a plasticizer.

In a particular embodiment, at least approximately 50% of the number of domains of the thermoplastic elastomer component can have an aspect ratio of no greater than approximately 1.5. In some embodiments, the aspect ratio of at least 50% of the number of domains of the thermoplastic elastomer component is at least approximately 0.5, at least approximately 0.8, or at least approximately 1.3. In other embodiments, the aspect ratio of at least 50% of the number of domains of the thermoplastic elastomer component is no greater than approximately 1.4, no greater than approximately 1.2, or no greater than approximately 0.9. Furthermore, a value of a major dimension of the domains of the thermoplastic elastomer component can be at least approximately 0.5 microns, at least approximately 0.8 microns, or at least approximately 1.2 microns. The value of the major dimension of the domains of the thermoplastic elastomer component may also be no greater than approximately 2 microns, no greater than approximately 1.7 microns, or no greater than approximately 1.5 microns.

In another embodiment, the thermoplastic elastomer tube 300 can have a polyolefin phase. The polyolefin phase can include one or more polyolefin components. In addition, the polyolefin phase can include a number of domains. In a particular embodiment, at least approximately 50% of the domains of the polyolefin component have an aspect ratio no greater than approximately 1.5.

The morphology of the thermoplastic elastomer tube 300 differs from the morphology of conventional thermoplastic elastomer tubes in that the miscibility of the thermoplastic elastomer phase and the polyolefin phase is minimized. For example, the purity of the thermoplastic elastomer phase and the polyolefin phase of the thermoplastic elastomer tube 300 is increased over conventional thermoplastic elastomer tubes. In another example, the domains of one or more of the phases of the thermoplastic elastomer tube 300 are larger and more spherically shaped than those of conventional thermoplastic elastomer tubes.

Without being held to a particular theory, the reduced miscibility between the thermoplastic elastomer phase and the polyolefin phase and the shape and size of the domains of the phases is a result of fewer processing steps used to produce the thermoplastic elastomer tube 300. To illustrate, the materials used to make conventional thermoplastic elastomer tubes are typically blended, heated, and cut multiple times before being formed into a tube shape. The multiple heat and shear histories of conventional thermoplastic elastomer tubes produces miscibility between the phases of these thermoplastic elastomer tubes. Those of skill in the art typically consider the miscibility of the phases of the thermoplastic elastomer tubes to contribute to improved physical properties. However, quite unexpectedly, the lack of miscibility between the phases of the thermoplastic elastomer tube 300 results in improved physical properties over tubes made using conventional processes. The lack of scission histories and heat histories for the thermoplastic elastomer tube 300 can also yield higher molecular weights for the components of the thermoplastic elastomer tube 300. Furthermore, the reduced processing used to form the thermoplastic elastomer tube 300 can result in more of a crystalline structure, which improves the thermal properties and physical properties of the thermoplastic elastomer tube 300.

Embodiments may be in accordance with any one or more of the items as listed below.

Item 1. A thermoplastic elastomer tube comprising: a thermoplastic elastomer component disposed within a matrix, wherein the thermoplastic elastomer component is disposed within the matrix in a thermoplastic elastomer phase having a number of domains, and wherein at least approximately 50% of the domains of the thermoplastic elastomer component have an aspect ratio of no greater than approximately 1.5.

Item 2. The thermoplastic elastomer tube as recited in item 1, wherein the aspect ratio is no greater than approximately 1.4, no greater than approximately 1.2, no greater than approximately 0.9, at least approximately 0.5, at least approximately 0.8, or at least approximately 1.3.

Item 3. The thermoplastic elastomer tube as recited in any one of the preceding items, wherein the matrix includes a polyolefin phase having a number of domains of a polyolefin component, wherein at least approximately 50% of the domains of the polyolefin component have an aspect ratio of no greater than approximately 1.5.

Item 4. A thermoplastic elastomer tube comprising: a thermoplastic elastomer component including at least a polymeric portion, wherein a molecular weight of the polymeric portion is at least approximately 70% of a molecular weight of an unprocessed sample of the polymeric portion.

Item 5. The thermoplastic elastomer tube as recited in item 4, wherein the molecular weight of the polymeric portion is no greater than approximately 95% of the molecular weight of the unprocessed sample of the polymeric portion, no greater than approximately 85% of the molecular weight of the unprocessed sample of the polymeric portion, at least approximately 75% of the molecular weight of the unprocessed sample of the polymeric portion, at least approximately 80% of the molecular weight of the unprocessed sample of the polymeric portion, or at least approximately 90% of the molecular weight of the unprocessed sample of the polymeric portion.

Item 6. The thermoplastic elastomer tube as recited in item 4 or 5, wherein the molecular weight of the polymeric portion is no greater than approximately 275,000, no greater than approximately 230,000, no greater than approximately 210,000, no greater than approximately 190,000, no greater than approximately 175,000, at least approximately 120,000, at least approximately 135,000, at least approximately 150,000, or at least approximately 165,000.

Item 7. The thermoplastic elastomer tube as recited in any one of items 4 to 6, wherein the molecular weight of the unprocessed sample of the polymeric portion is no greater than approximately 300,000, no greater than approximately 255,000, no greater than approximately 210,000, no greater than approximately 180,000, at least approximately 150,000, at least approximately 165,000, at least approximately 175,000, or at least approximately 185,000.

Item 8. The thermoplastic elastomer tube as recited in any one of items 4 to 7, wherein the thermoplastic elastomer tube further comprises a polyolefin component.

Item 9. A thermoplastic elastomer tube comprising:
at least approximately 20 wt % of a thermoplastic elastomer component comprising styrene; and
no greater than approximately 50 wt % of a polyolefin component;
wherein the thermoplastic elastomer tube has a tensile strength of at least approximately 1000 psi.

Item 10. An apparatus comprising:
a thermoplastic elastomer tube comprising at least approximately 20 wt % of a thermoplastic elastomer component comprising styrene and no greater than approximately 50 wt % of a polyolefin component, wherein the thermoplastic elastomer tube has a tensile strength of at least approximately 1000 psi; and
a pump to dispense fluid via the thermoplastic elastomer tube.

Item 11. The apparatus as recited in item 10, wherein the thermoplastic elastomer tube and the pump comprise a medical device to provide the fluid to a patient.

Item 12. The thermoplastic elastomer tube or the apparatus as recited in any one of items 9 to 11, wherein the tensile strength of the thermoplastic elastomer tube is no greater than approximately 2150 psi, no greater than approximately 2100 psi, no greater than approximately 1950 psi, no greater than approximately 1850 psi, at least approximately 1000 psi, at least approximately 1750 psi, at least approximately 1800 psi, or at least approximately 1900 psi.

Item 13. A process comprising:
providing a number of starting materials to a twin screw extruder, the starting materials including a thermoplastic elastomer;
mixing the starting materials in the twin screw extruder to provide a twin screw extruder output;
providing the twin screw extruder output to a pump; and
providing an output of the pump to a die to form a thermoplastic elastomer tube.

Item 14. The process as recited in item 13, further comprising heating the number of starting materials in the twin screw extruder to form a melt.

Item 15. The process as recited in item 14, wherein a temperature of the melt is no greater than approximately 230° C., no greater than approximately 205° C., no greater than approximately 195° C., no greater than approximately 190° C., no greater than approximately 185° C., or no greater than approximately 175° C., or no greater than approximately 160° C.

Item 16. The process as recited in any one of items 13 to 15, wherein a first portion of the number of starting materials comprise solid materials, a second portion of the number of starting materials comprise liquid materials, a third portion of the number of starting materials comprise gaseous materials, or a combination thereof.

Item 17. The process as recited in any one of items 13 to 17, wherein a pressure at an input of the die varies by no greater than approximately 10% from a specified input pressure, no greater than approximately 8% from the specified input pressure, no greater than approximately 6% from the specified input pressure, no greater than approximately 4% from the specified input pressure, or no greater than approximately 2% from the specified input pressure.

Item 18. The process as recited in any one of items 13 to 17, wherein the output of the pump is provided to the die and mandrel via one or more filtering devices.

Item 19. The process as recited in any one of items 13 to 18, further comprising cooling the thermoplastic elastomer tube.

Item 20. The process as recited in item 19, wherein the thermoplastic elastomer tube is cooled after providing the output of the pump to the die.

Item 21. The process as recited in item 19 or 20, wherein the thermoplastic elastomer tube is cooled via a water bath.

Item 22. The process as recited in item 21, wherein the water bath is disposed in a vacuum tank, open to the atmosphere, or both.

Item 23. The process as recited in any one of items 13 to 22, further comprising blending the starting materials before providing the starting materials to the twin screw extruder.

Item 24. The process as recited in any one of items 13 to 23, wherein the twin screw extruder is driven by a gear pump.

Item 25. The process as recited in any one of items 13 to 24, wherein the pump is a positive displacement pump.

Item 26. The process as recited in item 25, wherein the positive displacement pump is a melt pump.

Item 27. The process as recited in any one of items 13 to 26, wherein the pump is a single screw extruder.

Item 28. The process as recited in item 27, wherein the single screw extruder has a ratio of length to diameter (L/D) of no greater than approximately 24, no greater than approximately 16, or no greater than approximately 8.

Item 29. The process as recited in any one of items 13 to 28, further comprising providing one or more of the starting materials to the twin screw extruder via one or more liquid injection pumps.

Item 30. The process as recited in item 13 to 29, further comprising providing one or more of the starting materials to the twin screw extruder via one or more feeders coupled to the twin screw extruder.

Item 31. The process as recited in any one of items 13 to 30, further comprising providing at least a portion of the starting materials to the twin screw extruder via a side feeder.

Item 32. The process as recited in any one of items 13 to 31, wherein the thermoplastic elastomer tube comprises a thermoplastic elastomer component and a polyolefin component.

Item 33. The thermoplastic elastomer tube, apparatus, or process as recited in any one of items 1 to 12 and 32, wherein the thermoplastic elastomer tube has a 100% elongation modulus of no greater than approximately 510 psi, no greater than approximately 500 psi, no greater than approximately 475 psi, no greater than approximately 450 psi, no greater than approximately 430 psi, at least approximately 400 psi, at least approximately 425 psi, at least approximately 460 psi, or at least approximately 470 psi.

Item 34. The thermoplastic elastomer tube, apparatus, or process as recited in any one of items 1 to 12, 32, and 33, wherein the thermoplastic elastomer tube has a 300% elongation modulus of no greater than approximately 700 psi, no greater than approximately 675 psi, no greater than approximately 650 psi, no greater than approximately 625 psi, at least approximately 600 psi, at least approximately 630 psi, at least approximately 660 psi, or at least approximately 680 psi.

Item 35. The thermoplastic elastomer tube, apparatus, or process as recited in any one of items 1 to 12 and 32 to 34, wherein the thermoplastic elastomer tube has a Graves tear strength of no greater than approximately 270 pli, no greater than approximately 260 pli, no greater than approximately 235 pli, no greater than approximately 225 pli, at least approximately 180 pli, at least approximately 200 pli, at least approximately 220 pli, or at least approximately 250 pli.

Item 36. The thermoplastic elastomer tube, apparatus, or process as recited in any one of items 1 to 12 and 32 to 35, wherein the thermoplastic elastomer tube has a burst pressure of no greater than approximately 100 psi, no greater than approximately 95 psi, no greater than approximately 85 psi, no greater than approximately 75 psi, at least approximately 65 psi, at least approximately 70 psi, at least approximately 80 psi, or at least approximately 90 psi.

Item 37. The thermoplastic elastomer tube, apparatus, or process as recited in any one of items 1 to 12 and 32 to 37, wherein the thermoplastic elastomer tube has an enthalpy of mixing of no greater than approximately 21 J/g, no greater than approximately 20 J/g, no greater than approximately 17.5 J/g, no greater than approximately 16 J/g, at least approximately 15 J/g, at least approximately 16.5 J/g, at least approximately 18 J/g, or at least approximately 19 J/g.

Item 38. The thermoplastic elastomer tube, apparatus, or process as recited in any one of items 1 to 12 and 32 to 37, wherein the thermoplastic elastomer tube has a shore A hardness of no greater than approximately 80, no greater than approximately 75, no greater than approximately 65, no greater than approximately 50, at least approximately 40, at least approximately 45, at least approximately 55, at least approximately 60, or at least approximately 70.

Item 39. The thermoplastic elastomer tube, apparatus, or process as recited in any one of items 3, 8, 9 to 12, and 32 to 38, wherein the thermoplastic elastomer component includes a mixture of a plurality of polymers.

Item 40. The thermoplastic elastomer tube, apparatus, or process as recited in any one of items 3, 8, 9 to 12, and 32 to 39, wherein the thermoplastic elastomer component includes a co-polymer.

Item 41. The thermoplastic elastomer tube, apparatus, or process as recited in item 40, wherein the co-polymer comprises a block co-polymer.

Item 42. The thermoplastic elastomer tube, apparatus, or process as recited in item 41, wherein the block co-polymer comprises a mixture of a plurality of formulations of block-co-polymers containing styrene.

Item 43. The thermoplastic elastomer tube, apparatus, or process as recited in item 41 or 42, wherein the block co-polymer is selected from a group containing a styrene-butadiene-styrene block co-polymer, a styrene-isoprene-styrene block co-polymer, a styrene-isoprene/butadiene-styrene block co-polymer, a hydrogenated block co-polymer, or combinations thereof.

Item 44. The thermoplastic elastomer tube, apparatus, or process as recited in item 43, wherein the hydrogenated block co-polymer includes a styrene-ethylene-butylene-styrene (SEBS) block co-polymer, a styrene-ethylene-propylene-styrene (SEPS) block co-polymer, a styrene-ethylene-ethylene/propylene-styrene (SEEPS) block co-polymer, or a combination thereof.

Item 45. The thermoplastic elastomer tube, apparatus, or process as recited in any one of items 3, 8, 9 to 12, and 32 to 42, wherein the thermoplastic elastomer component is selected from a group containing a polyether-ester block co-polymer, a thermoplastic polyamide elastomer, a thermoplastic polyurethane elastomer, a thermoplastic polyolefin elastomer, a thermoplastic vulcanizate, a polyolefin plastomer, an olefin-based co-polymer, an olefin-based ter-polymer, or combinations thereof.

Item 46. The thermoplastic elastomer tube, apparatus, or process as recited in any one of items 3, 8, 9 to 12, and 32 to 45, wherein the thermoplastic elastomer tube comprises no greater than approximately 60 wt % of the thermoplastic elastomer component, no greater than approximately 55 wt % of the thermoplastic elastomer component, no greater than approximately 40 wt % of the thermoplastic elastomer component, at least approximately 25 wt % of the thermoplastic elastomer component, at least approximately 30 wt % of the thermoplastic elastomer component, or at least approximately 45 wt % of the thermoplastic elastomer component.

Item 47. The thermoplastic elastomer tube, apparatus, or process as recited in any one of items 3, 8, 9 to 12, and 32 to 46, wherein the thermoplastic elastomer tube comprises no greater than approximately 45 wt % of the polyolefin component, no greater than approximately 40 wt % of the polyolefin component, no greater than approximately 35 wt % of the polyolefin component, no greater than approximately 25 wt % of the polyolefin component, at least approximately 10 wt % of the polyolefin component, at least approximately 15 wt % of the polyolefin component, at least approximately 20% of the polyolefin component, or at least approximately 30 wt % of the polyolefin component.

Item 48. The thermoplastic elastomer tube, apparatus, or process as recited in any one of items 3, 8, 9 to 12, and 32 to 47, wherein the polyolefin component includes a mixture of a plurality of formulations of polyolefins.

Item 49. The thermoplastic elastomer tube, apparatus, or process as recited in any one of items 3, 8, 9 to 12, and 32 to 48, wherein the polyolefin component includes a polypropylene.

Item 50. The thermoplastic elastomer tube, apparatus, or process as recited in any one of the preceding items, wherein the thermoplastic elastomer tube includes a plasticizer.

Item 51. The thermoplastic elastomer tube, apparatus, or process as recited in item 50, wherein the plasticizer is mineral oil.

Item 52. The thermoplastic elastomer tube, apparatus, or process as recited in item 51, wherein the thermoplastic elastomer tube includes no greater than approximately 70 wt % mineral oil, no greater than approximately 60 wt % mineral oil, no greater than approximately 45 wt % mineral oil, no greater than approximately 35 wt % mineral oil, at least approximately 20 wt % mineral oil, at least approximately 40 wt % mineral oil, or at least approximately 50 wt % mineral oil.

Item 53. The thermoplastic elastomer tube, apparatus, or process as recited in any one of the preceding items, wherein the thermoplastic elastomer tube includes one or more additives.

Item 54. The thermoplastic elastomer tube, apparatus, or process as recited in item 53, wherein the one or more additives are selected from a group containing a silicone modifier, a stabilizer, a curing agent, a lubricant, a colorant, a filler, a blowing agent, an additional polymer, or any combination thereof.

Item 55. The thermoplastic elastomer tube, apparatus, or process as recited in any one of the preceding items, wherein the thermoplastic elastomer tube includes a hollow body having an inner bore and having an inner diameter, an outer diameter, and a length.

Item 56. The thermoplastic elastomer tube, apparatus, or process as recited in item 55, wherein the inner diameter is no greater than approximately 25 mm, no greater than approximately 20 mm, no greater than approximately 10 mm, at least approximately 0.5 mm, at least approximately 5 mm, or at least approximately 15 mm.

Item 57. The thermoplastic elastomer tube, apparatus, or process as recited in item 55 or 56, wherein the outer diameter is no greater than approximately 40 mm, no greater than approximately 30 mm, no greater than approximately 25 mm, no greater than approximately 10 mm, at least approximately 5 mm, at least approximately 15 mm, or at least approximately 20 mm.

Item 58. The thermoplastic elastomer tube, apparatus, or process as recited in any one of items 55 to 57, wherein the thermoplastic elastomer tube has a wall thickness of no greater than approximately 17 mm, no greater than approximately 15 mm, no greater than approximately 12 mm, no greater than approximately 10 mm, at least approximately 0.5 mm, at least approximately 2 mm, at least approximately 5 mm, or at least approximately 7 mm.

Item 59. The thermoplastic elastomer tube, apparatus, or process as recited in any one of items 55 to 58, wherein the length of the thermoplastic elastomer tube is no greater than approximately 100 cm, no greater than approximately 80 cm, no greater than approximately 65 cm, no greater than approximately 55 cm, at least approximately 5 cm, at least approximately 25 cm, at least approximately 35 cm, or at least approximately 45 cm.

Item 60. The thermoplastic elastomer tube, apparatus, or process as recited in any one of the preceding items, wherein the thermoplastic elastomer tube is formed from thermoplastic elastomer tubing having a length of no greater than approximately 800 m, no greater than approximately 650 m, no greater than approximately 400 m, no greater than approximately 200 m, no greater than approximately 75 m, at least approximately 10 m, at least approximately 35 m, at least approximately 50 m, at least approximately 125 m, at least approximately 350 m, or at least approximately 500 m.

Item 61. The thermoplastic elastomer tube, apparatus, or process as recited in any one of the preceding items, wherein the thermoplastic elastomer tube has a plurality of layers.

Item 62. Thermoplastic elastomer tubing comprising:
a hollow body having an inner diameter, an outer diameter, and a length;
a thermoplastic elastomer component disposed within a matrix; and wherein a standard deviation of the outer diameter is no greater than approximately 1.5% of an average outer diameter of the hollow body over the length.

Item 63. The thermoplastic elastomer tubing as recited in item 62, wherein the length is no greater than approximately 50 m, no greater than approximately 30 m, no greater than approximately 30 m, at least approximately 10 m, at least approximately 15 m, at least approximately 25 m, or at least approximately 40 m.

The concepts described herein will be further described in the following examples, which do not limit the scope of the disclosure described in the claims.

EXAMPLES

Example 1

Thermoplastic elastomer tubing is formed according to a process described in embodiments herein. In particular, a mixture including approximately 18 wt % to approximately 20 wt % polypropylene, approximately 35.5 wt % to 37.5 wt % of a styrene-ethylene-butadiene-styrene block co-polymer, approximately 42.5 wt % to approximately 45 wt % mineral oil, with the remainder being additives, such as a silicone modifier, is directly added to a twin screw extruder. The mixture is mixed and heated in the twin screw extruder to form a melt. The temperature profile of the twin screw extruder includes temperatures within a range of approximately 150° C. to approximately 180° C. The maximum temperature of the melt within the twin screw extruder is within a range of approximately 168° C. to approximately 173° C. In addition, the twin screw extruder is operated at a speed within a range of approximately 490 rotations per minute (rpm) to approximately 510 rpm at a torque within a range of approximately 37% to approximately 41%. The melt passes from the twin screw extruder to a gear pump via one or more filter devices. The speed of the gear pump is within a range of approximately 19 rpm to approximately 21 rpm. The melt is then extruded and cooled in a water bath. The output rate of the melt from the gear pump to the die and mandrel is within a range of approximately 18 lbs./hr. to approximately 22 lbs./hr. Physical properties are measured according to techniques described herein.

Example 2

Thermoplastic elastomer tubing is formed according to a process described in embodiments herein. In particular, a mixture including approximately 19 wt % to approximately 21 wt % polypropylene, approximately 34 wt % to 36 wt % of a styrene-ethylene-butadiene-styrene block co-polymer, approximately 44 wt % to approximately 46 wt % mineral oil, with the remainder being additives, such as a silicone modifier, is directly added to a twin screw extruder. The mixture is mixed and heated in the twin screw extruder to form a melt. The temperature profile of the twin screw extruder includes temperatures within a range of approximately 150° C. to approximately 180° C. The maximum temperature of the melt within the twin screw extruder is within a range of approximately 168° C. to approximately 173° C. In addition, the twin screw extruder is operated at a speed within a range of approximately 490 rotations per minute (rpm) to approximately 510 rpm at a torque within a range of approximately 32% to approximately 36%. The melt passes from the twin screw extruder to a gear pump via one or more filter devices. The speed of the gear pump is within a range of approximately 19 rpm to approximately 21 rpm. The melt is then extruded and cooled in a water bath. The output rate of the melt from the gear pump to the die and mandrel is within a range of approximately 18 lbs./hr. to approximately 22 lbs./hr. Physical properties are measured according to techniques described herein.

Comparative Example 1

Thermoplastic elastomer tubing is formed according to a process described in embodiments herein. In particular, a mixture having the same composition as Example 1 is used to form tubing according to a conventional process where the mixture is ribbon blended, mixed and melted using a twin screw extruder and pelletized. The pellets are then melted again in a twin screw extruder and subsequently pelletized. The speed of the twin screw extruder is within a range of approximately 590 rpm to approximately 610 rpm at a torque within a range of approximately 44% to approximately 48%. The temperature profile of the twin screw extruder includes temperatures within a range of approximately 160° C. to approximately 190° C. with a maximum melt temperature within a range of approximately 215° C. to approximately 220° C. The output rate from the twin screw extruder is within a range of approximately 290 lbs./hr. to approximately 310 lbs./hr. The second group of pellets is added to a single screw extruder, melted, and then extruded to form tubing. The single screw extruder is operated at a speed within a range of approximately 96 rpm to approximately 103 rpm at a torque within a range of approximately 30% to approximately 34%. The temperature profile of the single screw extruder includes temperatures within a range of approximately 160° C. to approximately 190° C. with a maximum melt temperature within a range of approximately 190° C. to approximately 194° C. The output rate from the single screw extruder depends on the dimensions of the tubing being formed. Physical properties are measured according to techniques described herein.

Table 1 includes physical properties for example 1 tubing and comparative example 1 tubing. The physical properties of example 1 tubing are improved over those of comparative example 1 tubing. For example, the 100% modulus of the example 1 tubing is improved by approximately 22% from the 100% modulus of the comparative example 1 tubing and the 300% modulus of the example 1 tubing is improved by approximately 21% over the 300% modulus of the comparative example 1 tubing. In addition, the tensile strength of the example 1 tubing is improved by approximately 140% over the tensile strength of the comparative example 1 tubing and the Graves tear strength of the example 1 tubing is improved by approximately 25% over the Graves tear strength of the comparative example 1 tubing. Further, the burst pressure of the example 1 tubing is improved by approximately 25% over the burst pressure of the comparative example 1 tubing. Ultimate elongation of the tubing of example 1 is also improved over the ultimate elongation of the tubing of comparative example 1 by approximately 14%.

Table 2 includes a measurement of the molecular weight of the styrene block co-polymer of example 1 tubing and a measurement of the molecular weight of the styrene block co-polymer of comparative example 1 tubing. Table 2 also includes a measurement of the molecular weight of an unprocessed sample of the styrene block co-polymer used to make the example 1 tubing and the comparative example 1 tubing. The molecular weight of the example 1 tubing is higher than that of the comparative example 1 tubing indicating decreased scission of the chains of the styrene block co-polymer.

TABLE 2

| Sample | Molecular Weight |
|---|---|
| Unprocessed Sample | 181,313 |
| Example 1 | 163,887 |
| Comparative Example 1 | 119,835 |

Table 3 includes values for enthalpy of mixing for example 1 tubing and example 2 tubing. The enthalpy of mixing for the example 1 tubing is higher than that of the comparative example 1 tubing indicating a higher degree of crystallinity for the example 1 tubing and also indicates that the process used to make the example 1 tubing is less degradative than the process used to make the comparative example 1 tubing.

TABLE 3

| Sample | Enthalpy of Melting (J/g) |
|---|---|
| Example 1 | 17.7 |
| Comparative Example 1 | 14.9 |

Figure 4:
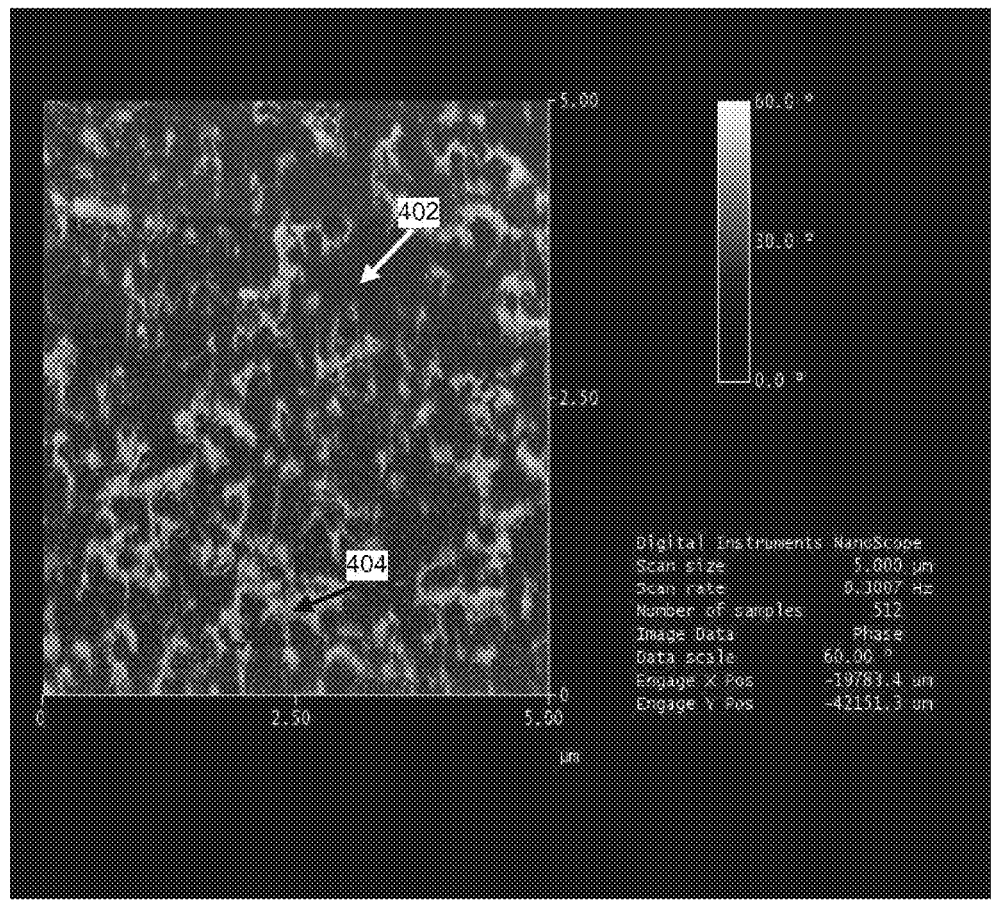
FIG. 4 is an image of a portion of a thermoplastic elastomer tube formed by a conventional process.
Figure 5:
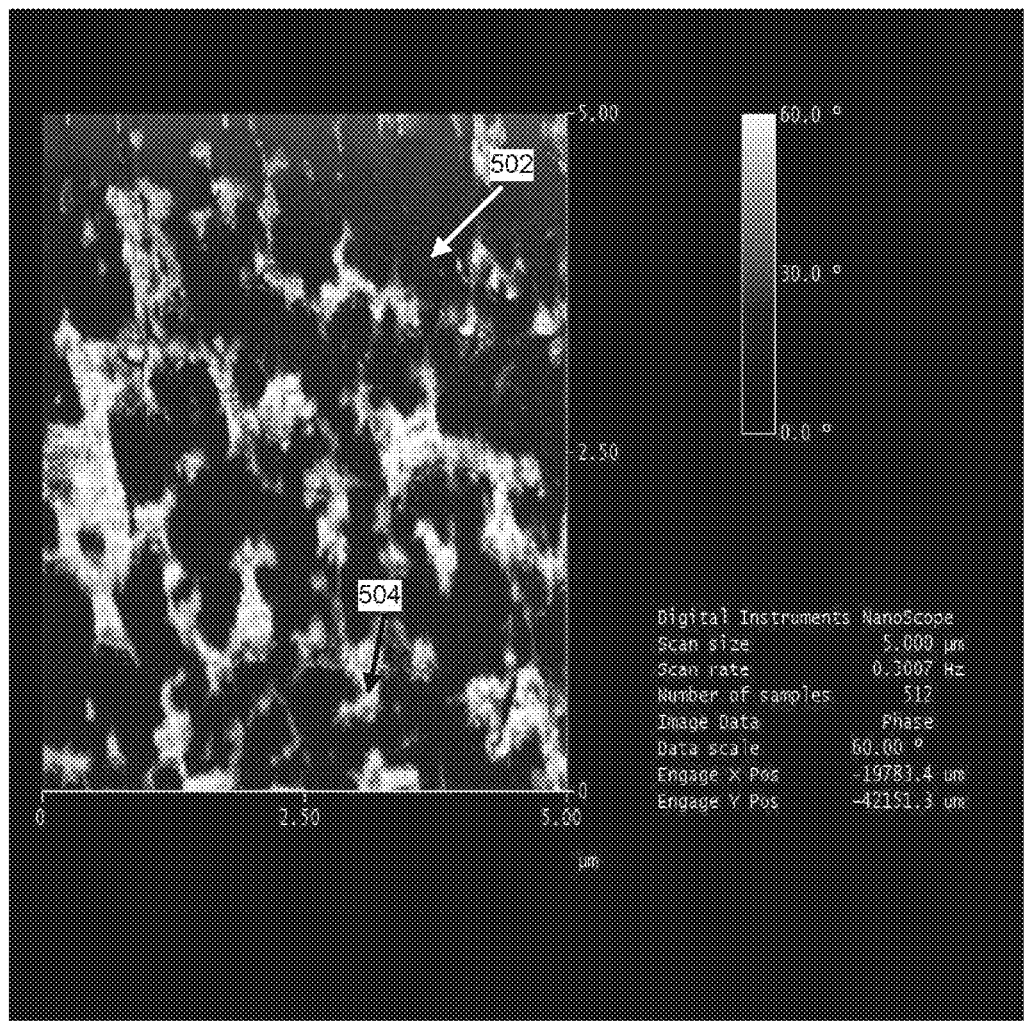
FIG. 5 is an image of a portion of a first thermoplastic elastomer tube formed according to embodiments described herein.
Figure 6:
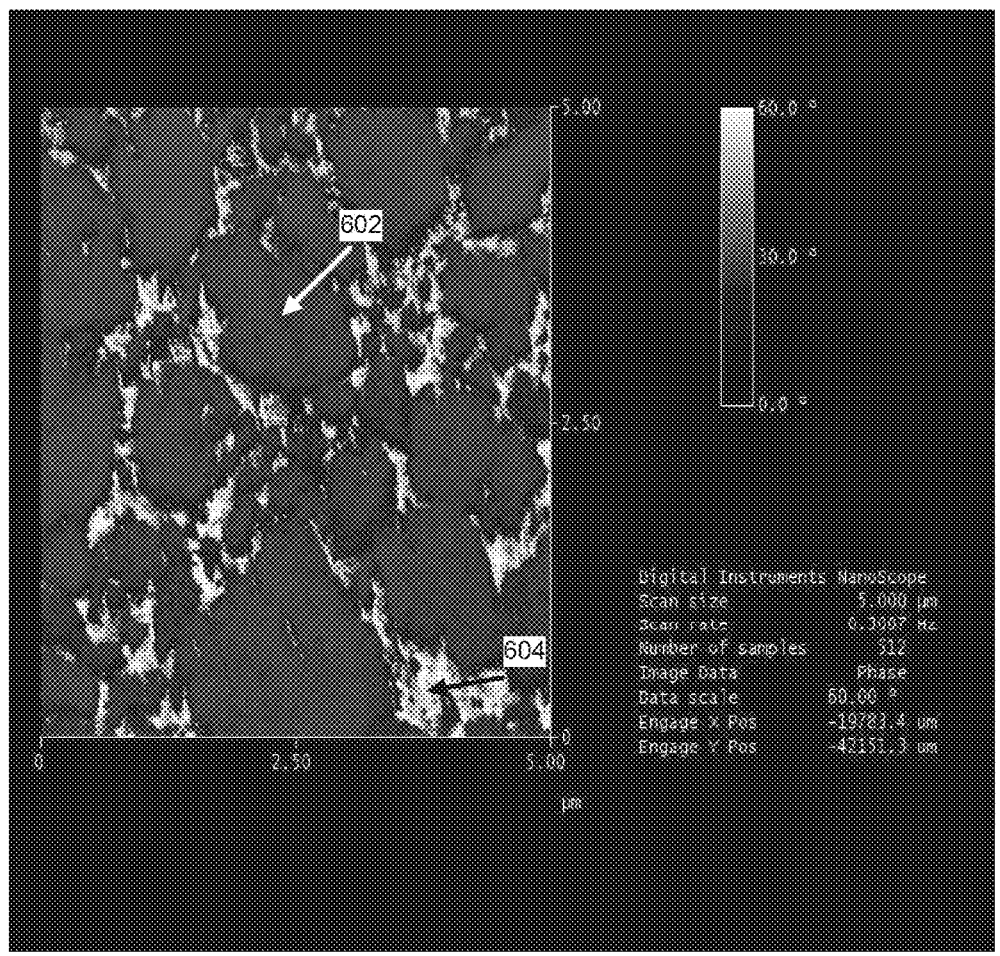
FIG. 6 is an image of a second thermoplastic elastomer tube formed according to embodiments described herein.

FIG. 4 is an image of a portion of a thermoplastic elastomer tube formed by a conventional process. In particular, FIG. 4 is an atomic force microscopy (AFM) image of a portion of the comparative example 1 tubing. In addition, FIG. 5 is an image of a portion of a first thermoplastic elastomer tube formed according to embodiments described herein. In particular, FIG. 5 is an AFM image of a portion of the example 1 tubing. Further, FIG. 6 is an image of a second thermoplastic elastomer tube formed according to embodiments described herein. In particular, FIG. 6 is an AFM image of a portion of the example 2 tubing.

FIG. 4 illustrates increased miscibility between domains of the thermoplastic elastomer component (dark colored areas, such as domains 402, 502, 602) and the polyolefin component (light colored areas, such as domains 404, 504, 604) as compared to the domains of thermoplastic elastomer components and the polyolefin components of FIG. 5 and FIG. 6. Additionally, the purity of the polyolefin component of the comparative example 1 sample illustrated in FIG. 4 is lower than that of the polyolefin component of the example

TABLE 1

| | Shore A Hardness | 100% Modulus (psi) | 300% Modulus (psi) | Break Strength (psi) | Graves Tear Strength (psi) | Burst Pressure (psi) | Ultimate Elongation (%) |
|---|---|---|---|---|---|---|---|
| Ex. 1 | 58 | 452 | 655 | 1981 | 225 | 80-83 | 820 |
| Comp. Ex. 1 | 56 | 369 | 539 | 821 | 179 | 63-64 | 722 |
| Improvement (%) | — | 22 | 21 | 140 | 25 | 25 | 14 |

1 sample and the example 2 sample in FIG. 5 and FIG. 6, respectively, as indicated by the darker coloring of the domains 404 in relation to the domains 504 and 604. Furthermore, the domains 502 and 602 of the thermoplastic elastomer components of FIG. 5 and FIG. 6 are more spherical in shape and have increased size when compared with the domains 402 of the thermoplastic elastomer component in FIG. 4.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A process comprising:
providing a number of starting materials to a twin screw extruder, the starting materials including a thermoplastic elastomer;
mixing the starting materials in the twin screw extruder to provide a twin screw extruder output;
providing the twin screw extruder output to a pump; and
providing an output of the pump to a die to form a thermoplastic elastomer tube comprising:
a matrix including a thermoplastic elastomer phase, the thermoplastic elastomer phase comprising a plurality of domains comprising a thermoplastic elastomer component, wherein at least approximately 50% of the plurality of domains comprising the thermoplastic elastomer component have an aspect ratio of no greater than approximately 1.5, and
wherein (a) the thermoplastic elastomer tube comprises no greater than approximately 60 wt % of the thermoplastic elastomer component and at least approximately 25 wt % of the thermoplastic elastomer component, (b) an average value of a major dimension of the plurality of domains is at least 1.2 microns, or both.

2. The process of claim 1, further comprising heating the number of starting materials in the twin screw extruder to form a melt.

3. The process of claim 2, wherein a temperature of the melt is no greater than approximately 230° C.

4. The process of claim 1, wherein a first portion of the number of starting materials comprises solid materials, a second portion of the number of starting materials comprises liquid materials, a third portion of the number of starting materials comprises gaseous materials, or a combination thereof.

5. The process of claim 1, wherein a pressure at an input of the die varies by no greater than approximately 10% from a specified input pressure.

6. The process of claim 1, wherein the output of the pump is provided to the die and mandrel via one or more filtering devices.

7. The process of claim 1, further comprising cooling the thermoplastic elastomer tube.

8. The process of claim 7, wherein the thermoplastic elastomer tube is cooled after providing the output of the pump to the die.

9. The process of claim 7, wherein the thermoplastic elastomer tube is cooled via a water bath.

10. The process of claim 9, wherein the water bath is disposed in a vacuum tank, open to the atmosphere, or both.

11. The process of claim 1, further comprising blending the starting materials before providing the starting materials to the twin screw extruder.

12. The process of claim 1, wherein the twin screw extruder is driven by a gear pump.

13. The process of claim 1, wherein the pump is a positive displacement pump.

14. The process of claim 13, wherein the positive displacement pump is a melt pump.

15. The process of claim 1, wherein the pump is a single screw extruder.

16. The process of claim 15, wherein the single screw extruder has a ratio of length to diameter (L/D) of no greater than approximately 24.

17. The process of claim 1, further comprising providing one or more of the starting materials to the twin screw extruder via one or more liquid injection pumps.

18. The process of claim 1, further comprising providing one or more of the starting materials to the twin screw extruder via one or more feeders coupled to the twin screw extruder.

19. The process of claim 1, further comprising providing at least a portion of the starting materials to the twin screw extruder via a side feeder.

* * * * *